US012722907B1

(12) United States Patent
Ganesh et al.

(10) Patent No.: US 12,722,907 B1
(45) Date of Patent: Sep. 1, 2026

(54) SYSTEM DETERMINATIVE OF CORRECT ORIENTATION OF COMPONENTS DURING AN AUTOMATION PROCEDURE

(71) Applicant: MEDICAL DEVICE ENGINEERING, LLC, Pompano Beach, FL (US)

(72) Inventors: Omesh Ganesh, Pompano Beach, FL (US); Peter Lehel, Boca Raton, FL (US)

(73) Assignee: MEDICAL DEVICE ENGINEERING, LLC, Pompano Beach, FL (US)

( * ) Notice: Subject to any disclaimer, the term of this patent is extended or adjusted under 35 U.S.C. 154(b) by 87 days.

(21) Appl. No.: 18/623,678

(22) Filed: Apr. 1, 2024

Related U.S. Application Data

(60) Provisional application No. 63/456,391, filed on Mar. 31, 2023.

(51) Int. Cl.
*B65G 47/256* (2006.01)

(52) U.S. Cl.
CPC .... *B65G 47/256* (2013.01); *B65G 2203/0225* (2013.01)

(58) Field of Classification Search
None
See application file for complete search history.

(56) References Cited

U.S. PATENT DOCUMENTS 722,943 A 3/1903 Chappell
732,662 A 6/1903 Smith
1,678,991 A 7/1928 Marschalek
1,970,631 A 8/1934 Sherman
2,186,888 A 1/1940 Tullar et al.
2,277,936 A 3/1942 Rosenblatt
(Continued)

FOREIGN PATENT DOCUMENTS

CN 110589435 A * 12/2019 ............ B65G 47/28
DE 202008018507 2/2015
(Continued)

OTHER PUBLICATIONS

Arai Tsugio, Pilfering Proof Cap, Jan. 9, 1996.

*Primary Examiner* — Gene O Crawford
*Assistant Examiner* — Muhammad Awais
(74) *Attorney, Agent, or Firm* — Malloy & Malloy, P.L.; Jennie S. Malloy

(57) ABSTRACT

A system determinative of correct orientation of components during an automation procedure, including a path of travel of the components and an ejection zone disposed along the path of travel. An orientation detector includes a detection structure integrated into the path of travel and disposed and configured to determine the orientation of the components based on the physical characteristics thereof. The detection structure is disposed in interruptive, movable engagement with disoriented ones of the plurality of components and is configured to displace such disoriented components from said path of travel into an ejection zone. An ejector is disposed in operative communication with the ejection zone and is structurally operative to displace the disoriented components from the ejection zone and remove them from said path of travel.

18 Claims, 12 Drawing Sheets

(56) References Cited

U.S. PATENT DOCUMENTS 2,459,304 A 1/1949 Blank
2,477,598 A 8/1949 Hain
2,734,665 A 2/1956 Flamm
2,739,590 A 3/1956 Yochem
2,811,283 A 10/1957 Bowen
2,823,674 A 2/1958 Yochem
2,834,346 A 5/1958 Adams
2,875,761 A 3/1959 Helmer et al.
2,888,015 A 5/1959 Hunt
2,952,255 A 9/1960 Hein, Jr.
3,122,280 A 2/1964 Goda
3,180,532 A 4/1965 Michel
3,245,567 A 4/1966 Knight
3,301,256 A 1/1967 Cowley
3,323,798 A 6/1967 Miller
3,364,890 A 1/1968 Andersen
3,368,673 A 2/1968 Johnson
3,489,268 A 1/1970 Meierhoefer
3,568,673 A 3/1971 Cowley
3,574,306 A 4/1971 Alden
3,598,120 A 8/1971 Mass
3,610,241 A 10/1971 LeMarie
3,674,181 A 7/1972 Marks et al.
3,700,215 A 10/1972 Hardman et al.
3,706,307 A 12/1972 Hasson
3,710,922 A * 1/1973 Lanphere ............ B65G 47/256 198/398
3,712,749 A 1/1973 Roberts
3,726,445 A 4/1973 Ostrowsky et al.
3,730,325 A * 5/1973 Goodwin ................. B07C 5/02 198/398
3,747,751 A 7/1973 Miller et al.
3,850,329 A 11/1974 Robinson
3,872,867 A 3/1975 Killinger
3,904,033 A 9/1975 Haerr
3,905,375 A 9/1975 Toyama
3,937,211 A 2/1976 Merten
3,987,930 A 10/1976 Fuson
4,005,739 A 2/1977 Winchell
4,027,669 A 6/1977 Johnston et al.
4,043,334 A 8/1977 Brown et al.
4,046,145 A 9/1977 Choksi et al.
4,068,696 A 1/1978 Winchell
4,085,845 A 4/1978 Perfect
4,106,621 A 8/1978 Sorenson
4,216,585 A 8/1980 Hatter
4,216,872 A 8/1980 Bean
4,220,151 A 9/1980 Whitney
4,244,366 A 1/1981 Raines
4,252,122 A 2/1981 Halvorsen
4,271,972 A 6/1981 Thor
4,286,591 A 9/1981 Raines
4,286,640 A 9/1981 Knox et al.
4,313,539 A 2/1982 Raines
4,369,781 A 1/1983 Gilson et al.
4,420,085 A 12/1983 Wilson et al.
4,430,077 A 2/1984 Mittleman et al.
4,433,790 A 2/1984 Gibson
4,457,445 A 7/1984 Hanks et al.
4,482,071 A 11/1984 Ishiwatari
D277,783 S 2/1985 Beck
4,520,942 A 6/1985 Dwinell
4,521,237 A 6/1985 Logothetis
4,530,437 A 7/1985 Gray et al.
4,530,697 A 7/1985 Kuhlemann et al.
4,558,554 A 12/1985 Herbert
4,571,242 A 2/1986 Klien et al.
4,589,171 A 5/1986 McGill
4,608,646 A * 8/1986 Goodrich ................. B07C 5/10 198/395
4,664,259 A 5/1987 Landis
4,667,837 A 5/1987 Vitello et al.
4,676,530 A 6/1987 Nordgren et al.
4,693,707 A 9/1987 Dye
4,726,483 A 2/1988 Drozd
4,735,617 A 4/1988 Nelson et al.
4,742,910 A 5/1988 Staebler
4,743,229 A 5/1988 Chu
4,743,231 A 5/1988 Kay et al.
4,744,455 A * 5/1988 Dragotta ................ B65G 33/04 198/750.12
4,753,345 A 6/1988 Goodsir et al.
4,760,847 A 8/1988 Vaillancourt
4,784,493 A * 11/1988 Turcheck, Jr. ............ B07C 5/02 198/395
4,813,564 A 3/1989 Cooper et al.
4,819,784 A * 4/1989 Sticht .................. B65G 47/256 209/939
4,832,695 A 5/1989 Rosenberg et al.
4,834,706 A 5/1989 Beck et al.
4,842,592 A 6/1989 Caggiani et al.
4,844,906 A 7/1989 Hermelin et al.
4,863,451 A 9/1989 Marder
4,906,231 A 3/1990 Young
4,919,285 A 4/1990 Roof et al.
4,936,445 A 6/1990 Grabenkort
5,007,535 A 4/1991 Meseke et al.
5,009,323 A 4/1991 Montgomery et al.
5,024,323 A 6/1991 Bolton
5,049,129 A 9/1991 Zdeb et al.
5,057,093 A 10/1991 Clegg et al.
D323,392 S 1/1992 Bryne
5,078,696 A 1/1992 Nedbaluk
5,085,332 A 2/1992 Gettig et al.
5,090,564 A 2/1992 Chimienti
5,119,975 A 6/1992 Jemielita
5,133,454 A 7/1992 Hammer
5,135,496 A 8/1992 Vetter et al.
5,148,652 A 9/1992 Herzog
5,163,922 A 11/1992 McElveen, Jr. et al.
5,165,560 A 11/1992 Ennis, III et al.
5,230,429 A 7/1993 Etheredge, III
5,236,077 A * 8/1993 Hoppmann .......... B65G 47/525 198/395
5,267,983 A 12/1993 Oilschlager et al.
5,292,308 A 3/1994 Ryan
5,293,993 A 3/1994 Yates, Jr. et al.
5,295,599 A 3/1994 Smith
5,312,367 A 5/1994 Nathan
5,312,368 A 5/1994 Haynes
5,316,163 A 5/1994 von Schuckmann
5,328,466 A 7/1994 Denmark
5,328,474 A 7/1994 Raines
5,332,113 A 7/1994 Kusler, III et al.
5,356,380 A 10/1994 Hoekwater et al.
5,370,226 A 12/1994 Gollobin et al.
5,380,295 A 1/1995 Vacca
5,402,887 A 4/1995 Shillington
5,405,339 A 4/1995 Kohnen et al.
5,456,668 A 10/1995 Ogle, II
5,458,580 A 10/1995 Hajishoreh
5,468,224 A 11/1995 Souryal
5,474,178 A 12/1995 DiViesti et al.
5,484,413 A 1/1996 Gevorgian
5,505,705 A 4/1996 Galpin et al.
5,531,695 A 7/1996 Swisher
5,540,324 A 7/1996 Knapp
5,540,666 A 7/1996 Barta et al.
5,549,571 A 8/1996 Sak
5,558,648 A 9/1996 Shields
5,584,817 A 12/1996 van den Haak
5,588,239 A 12/1996 Anderson
5,611,445 A 3/1997 Kano et al.
5,617,954 A 4/1997 Kato et al.
5,624,402 A 4/1997 Imbert
5,662,233 A 9/1997 Reid
5,674,209 A 10/1997 Yarger
5,695,470 A 12/1997 Roussigne et al.
5,699,913 A 12/1997 Richardson
5,700,247 A 12/1997 Grimard et al.
5,702,374 A 12/1997 Johnson
5,706,985 A 1/1998 Feer
5,711,443 A 1/1998 Bennett
5,713,485 A 2/1998 Liff et al.

(56) References Cited

U.S. PATENT DOCUMENTS 5,776,124 A 7/1998 Wald
5,785,691 A 7/1998 Vetter et al.
5,797,885 A 8/1998 Rubin
5,807,343 A 9/1998 Tucker et al.
5,829,589 A 11/1998 Nguyen et al.
D402,766 S 12/1998 Smith et al.
5,842,567 A 12/1998 Rowe et al.
5,876,381 A 3/1999 Pond et al.
5,883,806 A 3/1999 Meador et al.
5,884,457 A 3/1999 Ortiz et al.
5,901,866 A 5/1999 Storar
5,902,269 A 5/1999 Jentzen
5,926,922 A 7/1999 Stottle
5,951,522 A 9/1999 Rosato et al.
5,951,525 A 9/1999 Thorne et al.
5,954,203 A 9/1999 Marconi
5,954,657 A 9/1999 Rados
5,957,166 A 9/1999 Safabash
5,957,314 A 9/1999 Nishida et al.
5,963,136 A 10/1999 O'Brien
5,983,596 A 11/1999 Corniani et al.
5,989,227 A 11/1999 Vetter et al.
5,993,437 A 11/1999 Raoz
6,000,548 A 12/1999 Tsals
D419,671 S 1/2000 Jansen
6,021,824 A 2/2000 Larsen et al.
6,027,482 A 2/2000 Imbert
6,068,614 A 5/2000 Kimber et al.
D430,293 S 8/2000 Jansen
6,112,951 A 9/2000 Mueller
D431,864 S 10/2000 Jansen
6,126,640 A 10/2000 Tucker et al.
6,190,364 B1 2/2001 Imbert
6,193,688 B1 2/2001 Balestracci et al.
6,196,593 B1 3/2001 Petrick et al.
6,196,998 B1 3/2001 Jansen et al.
6,216,885 B1 4/2001 Guillaume
6,235,376 B1 5/2001 Miyazaki et al.
6,279,746 B1 8/2001 Hussaini et al.
6,280,418 B1 8/2001 Reinhard et al.
6,287,671 B1 9/2001 Bright et al.
6,322,543 B1 11/2001 Singh et al.
6,325,227 B1 12/2001 Ekkert
6,338,200 B1 1/2002 Baxa et al.
6,358,241 B1 3/2002 Shapeton et al.
6,375,640 B1 4/2002 Teraoka
6,394,983 B1 5/2002 Mayoral et al.
6,439,276 B1 8/2002 Wood et al.
6,485,460 B2 11/2002 Eakins et al.
6,488,666 B1 12/2002 Geist
6,491,665 B1 12/2002 Vetter et al.
6,500,155 B2 12/2002 Sasso
6,520,935 B1 2/2003 Jansen et al.
6,540,697 B2 4/2003 Chen
6,565,529 B1 5/2003 Kimber et al.
6,581,792 B1 6/2003 Limanjaya
6,585,691 B1 7/2003 Vitello
6,592,251 B2 7/2003 Edwards et al.
6,666,852 B2 12/2003 Niedospial, Jr.
6,682,798 B1 1/2004 Kiraly
6,726,652 B2 4/2004 Eakins et al.
6,726,672 B1 4/2004 Hanly et al.
6,764,469 B2 7/2004 Broselow
6,796,586 B2 9/2004 Werth
6,821,268 B2 11/2004 Balestracci
D501,549 S 2/2005 McAllister et al.
6,921,383 B2 7/2005 Vitello
6,935,560 B2 8/2005 Andreasson et al.
6,942,643 B2 9/2005 Eakins et al.
6,961,638 B2 * 11/2005 Ouellette ............. B07C 5/3408 198/395
6,991,126 B2 1/2006 Jackel
7,036,661 B2 5/2006 Anthony et al.
7,055,273 B2 6/2006 Roshkoff
7,100,771 B2 9/2006 Massengale et al.
7,125,397 B2 10/2006 Woehr et al.
7,141,286 B1 11/2006 Kessler et al.
7,175,081 B2 2/2007 Andreasson et al.
7,182,256 B2 2/2007 Andreasson et al.
7,232,066 B2 6/2007 Anderasson et al.
7,240,926 B2 7/2007 Dalle et al.
7,258,222 B2 * 8/2007 Marti Sala ......... B65G 47/1464 198/393
7,299,981 B2 11/2007 Hickle et al.
7,367,964 B2 5/2008 Heinz et al.
7,374,555 B2 5/2008 Heinz et al.
7,404,500 B2 7/2008 Marteau et al.
7,410,803 B2 8/2008 Nollert et al.
7,425,208 B1 9/2008 Vitello
7,437,972 B2 10/2008 Yeager
7,438,704 B1 10/2008 Kawashima et al.
D581,046 S 11/2008 Sudo
D581,047 S 11/2008 Koshidaka
D581,049 S 11/2008 Sudo
7,482,166 B2 1/2009 Nollert et al.
D589,612 S 3/2009 Sudo
7,497,330 B2 3/2009 Anthony et al.
7,503,453 B2 3/2009 Cronin et al.
7,588,563 B2 9/2009 Guala
7,594,681 B2 9/2009 DeCarlo
7,608,057 B2 10/2009 Woehr et al.
7,611,487 B2 11/2009 Woehr et al.
7,632,244 B2 12/2009 Buehler et al.
D608,900 S 1/2010 Giraud et al.
7,641,636 B2 1/2010 Moesli et al.
D612,939 S 3/2010 Boone, III et al.
7,681,606 B2 3/2010 Khan et al.
7,698,180 B2 4/2010 Fago et al.
7,708,035 B2 5/2010 Windmiller
7,735,664 B1 6/2010 Peters et al.
7,748,892 B2 7/2010 McCoy
7,762,988 B1 7/2010 Vitello
7,766,919 B2 8/2010 Delmotte
7,802,313 B2 9/2010 Czajka
7,886,908 B2 2/2011 Farrar et al.
7,918,830 B2 4/2011 Langan et al.
7,922,213 B2 4/2011 Werth
7,988,004 B1 8/2011 Marret et al.
8,034,041 B2 10/2011 Domkowski et al.
8,079,518 B2 12/2011 Turner et al.
8,091,727 B2 1/2012 Domkowwski
8,118,788 B2 2/2012 Frezza
8,120,484 B2 2/2012 Chisholm
8,128,605 B2 3/2012 Masi et al.
8,137,324 B2 3/2012 Bobst
8,140,349 B2 3/2012 Hanson et al.
8,151,970 B2 * 4/2012 McDonald ........... B65G 47/256 198/395
8,231,585 B2 7/2012 Heinz et al.
8,252,247 B2 8/2012 Ferlic
8,257,286 B2 9/2012 Meyer et al.
8,328,082 B1 12/2012 Bochenko et al.
8,348,895 B1 1/2013 Vitello
8,353,869 B2 1/2013 Ranalletta et al.
8,413,410 B2 4/2013 Ulm et al.
8,413,811 B1 4/2013 Arendt
8,443,999 B1 5/2013 Reinders
D684,057 S 6/2013 Kwon
8,512,277 B2 8/2013 Del Vecchio
8,528,757 B2 9/2013 Bisio
8,556,074 B2 10/2013 Turner et al.
8,579,116 B2 11/2013 Pether et al.
8,591,462 B1 11/2013 Vitello
8,597,255 B2 12/2013 Emmott et al.
8,597,271 B2 12/2013 Langan et al.
8,616,413 B2 12/2013 Koyama
D701,304 S 3/2014 Lair et al.
8,672,902 B2 3/2014 Ruan et al.
8,702,674 B2 4/2014 Bochenko
8,777,910 B2 7/2014 Bauss et al.
8,777,930 B2 7/2014 Swisher et al.
8,813,944 B2 * 8/2014 Tanner ................ B65G 47/256 198/398
8,852,561 B2 10/2014 Wagner et al.

(56) References Cited

U.S. PATENT DOCUMENTS 8,864,021 B1 10/2014 Vitello
8,864,707 B1 10/2014 Vitello
8,864,708 B1 10/2014 Vitello
8,911,424 B2 12/2014 Weadock et al.
8,945,082 B2 2/2015 Geiger et al.
8,978,909 B2 3/2015 Kakutani et al.
8,985,305 B2 * 3/2015 Wong ................ B65G 47/1421 198/398
9,016,473 B2 4/2015 Tamarindo
9,027,769 B2 5/2015 Willows et al.
9,082,157 B2 7/2015 Gibson
9,095,667 B2 8/2015 Von Schuckman
9,101,534 B2 8/2015 Bochenko
D738,495 S 9/2015 Strong et al.
9,125,976 B2 9/2015 Uber, III et al.
D743,019 S 11/2015 Schultz
9,192,443 B2 11/2015 Tennican
9,199,042 B2 12/2015 Farrar et al.
9,199,749 B1 12/2015 Vitello et al.
9,220,486 B2 12/2015 Schweiss et al.
9,220,577 B2 12/2015 Jessop et al.
9,227,019 B2 1/2016 Swift et al.
D750,228 S 2/2016 Strong et al.
9,272,099 B2 3/2016 Limaye et al.
9,311,592 B1 4/2016 Vitello et al.
D756,777 S 5/2016 Berge et al.
9,336,669 B2 5/2016 Bowden et al.
D759,486 S 6/2016 Ingram et al.
D760,384 S 6/2016 Niunoya et al.
D760,902 S 7/2016 Persson
9,402,967 B1 8/2016 Vitello
9,427,715 B2 8/2016 Palazzolo et al.
9,433,768 B2 9/2016 Tekeste et al.
9,463,310 B1 10/2016 Vitello
D773,043 S 11/2016 Ingram et al.
9,480,801 B2 11/2016 Schiller et al.
D777,903 S 1/2017 Schultz
9,662,456 B2 5/2017 Woehr
D789,529 S 6/2017 Davis et al.
9,687,249 B2 6/2017 Hanlon et al.
9,694,948 B1 7/2017 Pakhomov et al.
9,744,304 B2 8/2017 Swift et al.
D797,928 S 9/2017 Davis et al.
D797,929 S 9/2017 Davis et al.
9,764,098 B2 9/2017 Hund et al.
9,821,152 B1 11/2017 Vitello et al.
D806,241 S 12/2017 Swinney et al.
D807,503 S 1/2018 Davis et al.
9,855,191 B1 1/2018 Vitello et al.
D815,945 S 4/2018 Fischer
9,987,438 B2 6/2018 Stillson
D825,746 S 8/2018 Davis et al.
10,039,913 B2 8/2018 Yeh et al.
D831,201 S 10/2018 Holtz et al.
D834,187 S 11/2018 Ryan
10,124,122 B2 11/2018 Zenker
10,166,343 B1 1/2019 Hunt et al.
10,166,347 B1 1/2019 Vitello
10,183,129 B1 1/2019 Vitello
10,207,099 B1 2/2019 Vitello
10,207,835 B2 * 2/2019 Wilhelm ................ B67B 3/064
D842,464 S 3/2019 Davis et al.
D847,373 S 4/2019 Hurwit et al.
10,293,987 B2 5/2019 Sattig et al.
10,300,263 B1 5/2019 Hunt
10,307,548 B1 6/2019 Hunt et al.
10,315,024 B1 6/2019 Vitello et al.
10,315,808 B2 6/2019 Taylor et al.
10,376,655 B2 8/2019 Pupke et al.
D859,125 S 9/2019 Weagle et al.
10,478,262 B2 11/2019 Niese et al.
10,555,872 B1 2/2020 Thorne
10,618,711 B2 4/2020 Weir
10,695,490 B2 6/2020 Perazzo et al.
10,758,684 B1 9/2020 Vitello et al.
10,759,611 B1 * 9/2020 Kalm .................... B65G 47/24
10,773,067 B2 9/2020 Davis et al.
10,800,556 B2 10/2020 Thorne et al.
D903,865 S 12/2020 Banik et al.
10,888,672 B1 1/2021 Vitello
10,898,659 B1 1/2021 Vitello et al.
10,912,898 B1 2/2021 Vitello et al.
10,933,202 B1 3/2021 Banik
10,940,087 B2 3/2021 Thorne et al.
10,953,162 B1 3/2021 Hunt et al.
11,040,149 B1 6/2021 Banik
11,040,154 B1 6/2021 Vitello et al.
11,065,181 B2 7/2021 Davis et al.
11,097,071 B1 8/2021 Hunt et al.
11,168,818 B2 11/2021 Fangrow
11,254,514 B2 * 2/2022 Vienot .............. B65G 47/1421
11,278,681 B1 3/2022 Banik et al.
D948,713 S 4/2022 Banik
11,357,588 B1 6/2022 Vitello et al.
11,413,406 B1 8/2022 Vitello et al.
11,426,328 B1 8/2022 Ollmann et al.
11,471,610 B1 10/2022 Banik et al.
11,523,970 B1 12/2022 Vitello et al.
11,541,180 B1 1/2023 Vitello et al.
11,690,994 B1 7/2023 Banik et al.
11,697,527 B1 7/2023 Hendren et al.
11,779,520 B1 10/2023 Vitello
11,793,987 B1 10/2023 Vitello et al.
11,850,210 B2 12/2023 Dadachanji et al.
11,857,751 B1 1/2024 Vitello
11,872,187 B1 1/2024 Vitello et al.
11,904,149 B1 2/2024 Vitello et al.
11,911,339 B1 2/2024 Lehel et al.
12,070,591 B1 8/2024 Vitello
12,172,803 B1 12/2024 Vitello et al.
12,195,241 B1 1/2025 Vitello et al.
12,201,230 B2 1/2025 Bell
12,383,463 B1 8/2025 Vitello et al.
12,478,449 B1 11/2025 Vitello et al.
12,545,483 B1 2/2026 Vitello et al.
2001/0003150 A1 6/2001 Imbert
2001/0034506 A1 10/2001 Hirschman et al.
2001/0041866 A1 11/2001 Capes et al.
2001/0056258 A1 12/2001 Evans
2002/0007147 A1 1/2002 Capes et al.
2002/0023409 A1 2/2002 Py
2002/0046962 A1 4/2002 Vallans et al.
2002/0079281 A1 6/2002 Hierzer et al.
2002/0097396 A1 7/2002 Schafer
2002/0099334 A1 7/2002 Hanson et al.
2002/0101656 A1 8/2002 Blumenthal et al.
2002/0104770 A1 8/2002 Shapeton et al.
2002/0133119 A1 9/2002 Eakins et al.
2002/0188259 A1 12/2002 Hickle et al.
2003/0041560 A1 3/2003 Kemnitz
2003/0055685 A1 3/2003 Cobb et al.
2003/0146617 A1 8/2003 Franko, Sr.
2003/0183547 A1 10/2003 Heyman
2003/0187403 A1 10/2003 Balestracci
2004/0008123 A1 1/2004 Carrender et al.
2004/0011623 A1 * 1/2004 Marti Sala ......... B65G 47/1471 198/373
2004/0064095 A1 4/2004 Vitello
2004/0116858 A1 6/2004 Heinz et al.
2004/0129738 A1 7/2004 Stukas
2004/0173563 A1 9/2004 Kim et al.
2004/0186437 A1 9/2004 Frenette et al.
2004/0225258 A1 11/2004 Balestracci
2005/0146081 A1 7/2005 MacLean et al.
2005/0148941 A1 7/2005 Farrar et al.
2005/0209555 A1 9/2005 Middleton et al.
2006/0049948 A1 3/2006 Chen et al.
2006/0084925 A1 4/2006 Ramsahoye
2006/0089601 A1 4/2006 Dionigi
2006/0169611 A1 8/2006 Prindle
2006/0173415 A1 8/2006 Cummins
2006/0189933 A1 8/2006 Alheidt et al.
2007/0060898 A1 3/2007 Shaughnessy et al.
2007/0106234 A1 5/2007 Klein

(56) References Cited

U.S. PATENT DOCUMENTS

2007/0142786 A1 6/2007 Lampropoulos et al.
2007/0191690 A1 8/2007 Hasse et al.
2007/0219503 A1 9/2007 Loop et al.
2007/0257111 A1 11/2007 Ortenzi
2008/0068178 A1 3/2008 Meyer
2008/0078146 A1 4/2008 Cirio
2008/0097310 A1 4/2008 Buehler et al.
2008/0106388 A1 5/2008 Knight
2008/0140020 A1 6/2008 Shirley
2008/0243088 A1 10/2008 Evans
2008/0302711 A1 12/2008 Windmiller
2008/0303267 A1 12/2008 Schnell et al.
2008/0306443 A1 12/2008 Neer
2009/0008356 A1 1/2009 Gadzic et al.
2009/0062744 A1 3/2009 Weilbacher et al.
2009/0084804 A1 4/2009 Caspary et al.
2009/0099552 A1 4/2009 Levy et al.
2009/0149815 A1 6/2009 Kiel et al.
2009/0166311 A1 7/2009 Claessens
2009/0212954 A1 8/2009 Adstedt et al.
2009/0326481 A1 12/2009 Swisher et al.
2010/0050351 A1 3/2010 Colantonio et al.
2010/0051491 A1 3/2010 Lampropoulos et al.
2010/0084403 A1 4/2010 Popish et al.
2010/0089862 A1 4/2010 Schmitt
2010/0126894 A1 5/2010 Koukol et al.
2010/0179822 A1 7/2010 Reppas
2010/0211016 A1 8/2010 Palmer-Felgate
2010/0228226 A1 9/2010 Nielsen
2010/0252564 A1 10/2010 Martinez et al.
2010/0283238 A1 11/2010 Deighan et al.
2010/0307108 A1 12/2010 Sink et al.
2011/0009836 A1 1/2011 Chebli et al.
2011/0044850 A1 2/2011 Solomon et al.
2011/0046550 A1 2/2011 Schiller et al.
2011/0046603 A1 2/2011 Felsovalyi et al.
2012/0064515 A2 3/2012 Knapp et al.
2012/0096957 A1 4/2012 Ochman
2012/0110950 A1 5/2012 Schraudolph
2013/0018356 A1 1/2013 Prince et al.
2013/0018536 A1 1/2013 Prince et al.
2013/0037383 A1* 2/2013 Iwasa .................... B65G 21/00 198/401
2013/0056130 A1 3/2013 Alpert et al.
2013/0088354 A1 4/2013 Thomas
2013/0145725 A1 6/2013 Bianco et al.
2013/0237949 A1 9/2013 Miller
2013/0269592 A1 10/2013 Heacock et al.
2014/0000781 A1 1/2014 Franko, Jr.
2014/0034536 A1 2/2014 Reinhardt et al.
2014/0069202 A1 3/2014 Fisk
2014/0069829 A1 3/2014 Evans
2014/0076840 A1 3/2014 Graux et al.
2014/0135738 A1 5/2014 Panian
2014/0155868 A1 6/2014 Nelson et al.
2014/0163465 A1 6/2014 Bartlett, II et al.
2014/0257843 A1 9/2014 Adler et al.
2014/0319141 A1 10/2014 Stratis et al.
2014/0326727 A1 11/2014 Jouin et al.
2014/0353196 A1 12/2014 Key
2014/0358078 A1 12/2014 Fischer et al.
2015/0013811 A1 1/2015 Carrel et al.
2015/0048045 A1 2/2015 Miceli et al.
2015/0112296 A1 4/2015 Ishiwata et al.
2015/0136632 A1 5/2015 Moir et al.
2015/0182686 A1 7/2015 Okihara
2015/0191633 A1 7/2015 De Boer et al.
2015/0246185 A1 9/2015 Heinz
2015/0251820 A1 9/2015 Glaser et al.
2015/0298414 A1 10/2015 Dittmer et al.
2015/0302232 A1 10/2015 Strassburger et al.
2015/0305982 A1 10/2015 Bochenko
2015/0310771 A1 10/2015 Atkinson et al.
2016/0067144 A1 3/2016 Chang
2016/0067422 A1 3/2016 Davis et al.
2016/0090456 A1 3/2016 Ishimaru et al.
2016/0136352 A1 5/2016 Smith et al.
2016/0144119 A1 5/2016 Limaye et al.
2016/0158110 A1 6/2016 Swisher et al.
2016/0158449 A1 6/2016 Limaye et al.
2016/0176550 A1 6/2016 Viitello et al.
2016/0194121 A1 7/2016 Ogawa et al.
2016/0250420 A1 9/2016 Maritan et al.
2016/0279032 A1 9/2016 Davis
2016/0328586 A1 11/2016 Bowden et al.
2016/0361235 A1 12/2016 Swisher
2016/0367439 A1 12/2016 Davis et al.
2017/0007771 A1 1/2017 Duinat et al.
2017/0014310 A1 1/2017 Hyun et al.
2017/0124289 A1 5/2017 Hasan et al.
2017/0173321 A1 6/2017 Davis et al.
2017/0203086 A1 7/2017 Davis
2017/0225843 A1 8/2017 Glaser et al.
2017/0239141 A1 8/2017 Davis et al.
2017/0297781 A1 10/2017 Kawamura
2017/0319438 A1 11/2017 Davis et al.
2017/0328758 A1 11/2017 Fuchs
2017/0349335 A1 12/2017 Sattig et al.
2017/0354792 A1 12/2017 Ward
2018/0001540 A1 1/2018 Byun
2018/0014998 A1 1/2018 Yuki et al.
2018/0064604 A1 3/2018 Drmanovic
2018/0078684 A1 3/2018 Peng et al.
2018/0089593 A1 3/2018 Patel et al.
2018/0098915 A1 4/2018 Rajagopal et al.
2018/0147115 A1 5/2018 Nishioka et al.
2018/0236177 A1 8/2018 Schraga
2018/0312305 A1 11/2018 Rognard
2019/0275313 A1 9/2019 Godin et al.
2019/0308006 A1 10/2019 Erekovcanski et al.
2019/0388626 A1 12/2019 Okihara
2021/0228445 A1 7/2021 Bouteloup et al.
2021/0244892 A1 8/2021 Maritan et al.
2022/0008645 A1 1/2022 Ukai et al.
2022/0024630 A1 1/2022 Bohamed
2022/0257467 A1 8/2022 Yano et al.
2022/0296470 A1 9/2022 Wagner
2022/0339067 A1 10/2022 Christine et al.
2023/0036805 A1 2/2023 Rey

FOREIGN PATENT DOCUMENTS

DE 102020123373 A1 * 3/2022 ........... B65G 11/023
DE 102020123392 A1 * 3/2022 ........... B65G 11/023
DE 102020131870 A1 * 6/2022 ........... B65G 47/256
EP 0148116 7/1985
EP 269920 6/1988
EP 571980 12/1993
EP 2724977 4/2014
EP 2937616 10/2015
GB 486367 6/1938
GB 2102774 2/1983
JP 08002544 1/1996
JP 2014076618 A * 5/2014 ........... B65G 47/256
KR 101159987 6/2012
KR 101868822 6/2018
WO WO-8607040 A1 * 12/1986 ......... B65G 47/1457
WO WO9118801 12/1991
WO WO1992003348 3/1992
WO WO2008000279 1/2008
WO WO2017086607 5/2015
WO WO2025003684 1/2025

* cited by examiner

SYSTEM DETERMINATIVE OF CORRECT ORIENTATION OF COMPONENTS DURING AN AUTOMATION PROCEDURE

CLAIM OF PRIORITY

The present application is based on, and a claim of priority is made under 35 U.S.C. Section 119 (e) to a provisional patent application that is currently pending in the U.S. Patent and Trademark Office, namely, that having Ser. No. 63/456,391 and a filing date of Mar. 31, 2023, and which is incorporated herein by reference.

FIELD OF THE INVENTION

This invention is directed to a system which determines if each of a plurality of components, traveling along a path of travel, is correctly oriented or disoriented for intended processing by an automation procedure. The automation procedure may involve, but not limited to, the filling, attachment, etc. of the plurality components, wherein the disoriented components are removed from the path of travel.

DESCRIPTION OF THE RELATED ART

In the manufacturing industry, high-volume production of multiple component assemblies typically involve automation to assemble several components into a final assembly, thereby creating a finished product.

In accomplishing such automation, the assembly line uses multiple pieces of automatic equipment and sensor technology to assemble the components and create the final product. Such a process frequently requires a components supply such as, but not limited to, bowl feeders directing each of a plurality of components into the assembly line. In the alternative, pick-and-placed robotics are used to insert components into one another. When related components are so assembled and/or inserted into one another, commonly, the insertion of one component into another can only be done in a specific direction requiring a receiving component to be in a specific orientation. In the case of bowl feeders, as well as other type of component supply feeding facilities, sensors and different types of automated equipment are utilized to remove or otherwise displace, reposition, etc. a receiving component which is not properly oriented in order to proceed with the intended automation.

Therefore, there is a need in this area of the manufacturing industry for a system, method and/or structure to determine the proper orientation of a plurality of components traveling along an intended automation or assembly line. Moreover, such an improved system, method, etc. would further facilitate the removal or displacement of any of the plurality of components which are not properly oriented from the assembly line, in a simple, effective and reliable manner and preferably without the use of expensive and sometimes complicated sensor capabilities, of the type commonly used in related conventional or currently known automated procedures.

In addition, such an improved system and/or method as well as related structure should be specifically, but not exclusively, adaptable for use with a plurality of lightweight relatively small components molded or otherwise formed from a plastic material. Also, the efficiency, versatility and reliable simplicity of such an improved system may involve orientation determination of each of the plurality of parts based, at least in part, on the physical characteristics of the component. Such physical characteristics may include, but are not limited to, the dimension and/or configuration of the component concurrent to its continuous movement along the automation or assembly line.

Finally, such an improved and innovative system, method, etc. should demonstrate efficiency and reliability and require minimal maintenance and/or downtime during extended periods of continued usage.

SUMMARY OF THE INVENTION

The present invention is directed to a system and attendant structure for implementing the system, which determines the orientation of each of a plurality of components passing along an assembly line or "path of travel" during an automation procedure. As set forth herein, such automation procedure may vary and include different automated processes for filling, assembling, connecting, etc. the components, wherein disposition of the components in a correct orientation is necessary for performing the specific automation procedure (filling, connecting, etc.).

The path of travel may comprise an elongated rail extending between a supply of such components and an area where one or more automated procedures are performed. Moreover, the rail is structured, dimensioned and configured to accomplish intended conveyance of the plurality of components, while concurrently facilitating the determination of each of the plurality of components being in a correct orientation or being disoriented. Upon determination of a disoriented component the structural and operative features of the system serve to remove each disoriented component from the path of travel and in certain embodiments return it to the original supply of components.

Further by way of nonlimiting example, the component supply may be in the form of a bowl feeder of the type commonly known and conventionally used to orient and feed individual parts for assembly. Further, bowl feeders are typically structured to provide vibration in a self-contained device designed to manipulate a plurality of parts, components, etc. of the same type into a specific orientation. As practically utilized, bowl feeders usually include an out-feed track to convey oriented parts along and discharge them into an assembly or production line for further processing. However, as recognized the proper orientation of the parts or components passing from the bowl feeder may not always be in the correct orientation. As a result, disoriented parts or components cannot be properly processed. Therefore, the system of the present invention as well as the structure operatively associated therewith serves to accurately and reliable determine and remove any of a plurality of components passing along an intended path of travel.

Therefore, in more specific terms, the system of the present invention includes an ejection zone cooperatively disposed along the path of travel in communicating relation with at least disoriented ones of the plurality of components. Further, an ejector is disposed within or in direct communicating relation with the ejection zone. The ejector is operative to remove the disoriented components from the path of travel and from the rail which at least partially defines the path of travel. Further, an orientation detector is disposed along the path of travel and structured to detect and at least partially segregate disoriented components from the remainder of the plurality of components which are correctly oriented.

The orientation detector comprises a detection structure disposed and configured for "orientation determination" of the components traveling along the path of travel, wherein orientation determination is based on the physical characteristics including size and/or configuration of at least predetermined parts of the plurality of components, as will be explained in greater detail hereinafter. Further, in at least one embodiment, the detection structure is integrated in the rail along a portion of its length thereof. Such integration may comprise an integral formation of the detection structure to the rail or an attachment or connection thereto in an intended and appropriate location. Further, the detection structure is disposed and configured to segregate disoriented components from a remainder of the plurality of correctly oriented components by a displacement thereof from the path of travel. Such displacement comprises the disposition of the disoriented components outwardly from the interior of the rail into the aforementioned ejection zone. Once at least partially disposed within the ejection zone, the disoriented component will be positioned in direct exposure to the ejector which is operative to force a removal of each of the disoriented components from the rail and/or path of travel. In at least one embodiment, the ejector is operative to force any disoriented component disposed within the ejection zone back into the component supply or bowl feeder. Once returned to the component supply, the discarded or displaced disoriented component may be reprocessed within or by the bowl feeder, or other type components supply, to assume the correct orientation upon return to the path of travel.

Additional structural and operative features of one embodiment of the detection structure comprises at least one, but more practically a plurality of two angled ramp segments. Each of the preferably two angled ramp segments are integrated into the rail, as set forth above, in spaced and aligned relation to one another, on opposite sides of the rail. In addition, the structural configuration and dimension of each of the angled ramp segments may be substantially equivalent and comprise an inclined ramp structure extending from the bottom or lower part of the rail to an upper or outer part thereof. Moreover, the inclined ramp includes a configuration which is angled or flared upwardly and outwardly from the interior the rail to the exterior, upper portion thereof. Such an angled or flared configuration may be more specifically defined by a compound angled configuration. Therefore, the disposition, dimension and configuration of the cooperatively disposed two angled ramp segments will serve to interrupt and engage predetermined portions of disoriented components as they travel along the rail from the component supply. Due to the upwardly and outwardly flared, angled and/or compound angled configuration of the exposed surfaces of the angled ramp segments, the engaged disoriented components will be effectively displaced by being lifted or raised out of the interior of the rail into the aforementioned ejection zone. As set forth above, once disposed in the ejection zone each displaced disoriented component will be directly exposed to the ejector causing its removal from the ejection zone, rail and path of travel.

Yet additional structural and operative features of the path of travel and specifically including the rail facilitate the "orientation determination" of the plurality of components in cooperation with the operative features of the orientation detector and detection structure. More specifically, at least a portion of the length of the rail which is operatively associated with the aforementioned detection structure comprises a first rail segment and a second rail segment. The first and second rail segments are disposed in aligned relation to one another and collectively define at least a portion of the path of travel. However, the first and second rail segments include different physical characteristics such as, but not necessarily limited to, the width thereof. Therefore, in at least one embodiment the width or other appropriate dimension of the first rail segment is greater than that of the second rail segment. As a result, and as explained in greater detail hereinafter, a plurality of components which are both correctly oriented and disoriented are sized and/or configured to travel along the first segment. In contrast, the width or other appropriate dimension of the second segment is less than that of the first segment. As such, the second segment is only dimensioned to facilitate or allow travel of correctly oriented components there along.

In cooperation with the differences in the physical characteristics of the first and second rail segments, the orientation detector and more specifically the detection structure is disposed in at least partially segregating relation therebetween. As indicated herein, the detection structure is operative to remove disoriented components from the rail based on the compound angled and/or outwardly and upwardly flared configuration of the two angled ramp segments. Accordingly, the segregating features of the detection structure comprises the removal or displacement of the disoriented components traveling along the first rail segment to a point where they are interrupted and engaged by the detection structure. However, the dimension and disposition of the detection structure is such as to allow correctly oriented components to pass thereby without being engaged or otherwise interacting with the cooperatively disposed angled ramp segments defining the detection structure. As a further result and as dictated by the lesser dimensional characteristics of the second rail segment, only correctly oriented components will be allowed to pass there along as they bypass the angled ramp segments of the detection structure.

Yet other features of the structure and operation attendant to the system of the present invention comprises, in at least one embodiment, the aforementioned ejector comprising a source of pressurized fluid practically applied in the form of an air jet. The air jet comprises a flow of pressurized air issuing therefrom. As indicated, the air jet will be disposed within and/or in direct communicating with the ejection zone. As a result, a flow of pressurized air will be directed onto any disoriented component displaced into the ejection zone, through interaction with the detection structure as indicated. Further, in at least one embodiment the ejector, specifically including the air jet and the pressurized fluid flow issuing there from, will be disposed above the rail and or path of travel but in direct exposure to any disoriented component disposed within the ejection zone. However, the raised or outwardly disposed pressure jet will be above and out of communication with the plurality of correctly oriented components as they travel from the first rail segment, through or by the detection structure, it's into along the second rail segment.

The structural and operative features of the present invention further include the rail including oppositely disposed spaced apart retaining sides or walls extending along the opposite longitudinal peripheral edges of both the first rail segment and the second rail segment. Therefore, the disposition of the retaining sides of the rail will serve to maintain stability of the plurality of correctly oriented and disoriented components during their travel or movement along the rail. Also, forced travel of the plurality of components along the rail will be accomplished by an effective force-feeding of components from the component supply into and along the path of travel, as adjacent ones of the plurality of components will be disposed in engagement with one another.

In cooperation with the retaining sides of the rail is the inclusion of a gate or open area disposed in substantially adjacent or at least partially aligned relation to the ejection zone. Such disposition and open configuration of the gate facilitates displacement of any disoriented component from the ejection zone by the force of exerted thereon from the pressurized fluid from and air jet.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
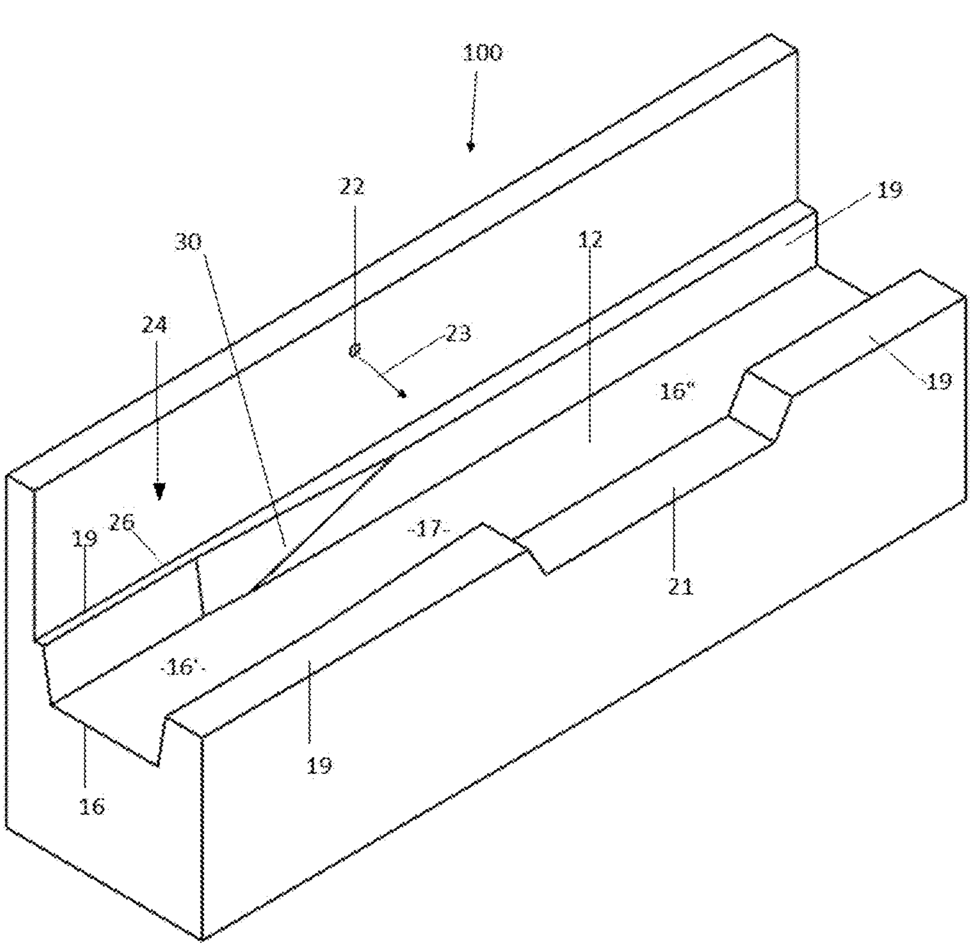
FIG. 1 is a top perspective view of a path of travel and associated components with which a system of the present invention is utilized and practiced.

The present invention is directed to a system and attendant structure, generally indicated as 100 in FIG. 1, used in the implementation of the present invention. As practiced, the system 100, determines the orientation of each of a plurality of components 10 passing along an assembly line or "path of travel" 12 during an automation procedure. As set forth herein, such automation procedure may vary and include different automated processes for filling, assembling etc. the components, wherein disposition of the components 10 in a correct orientation is necessary for performing the specific automation procedure (filling, assembling, connecting, etc.).

Figure 2:
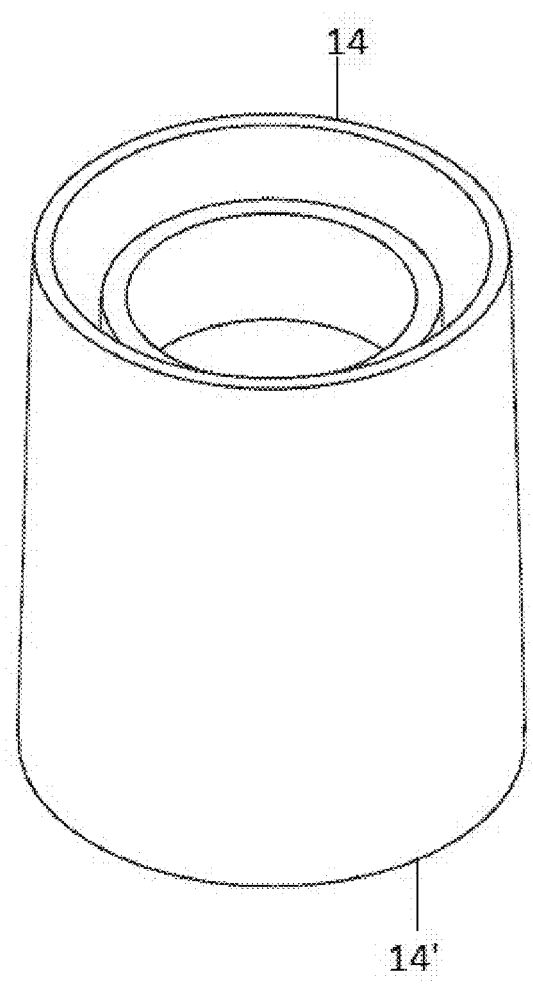
FIG. 2 is a perspective view of one of a possible plurality of components with which the system of the present invention may be utilized.
Figure 3:
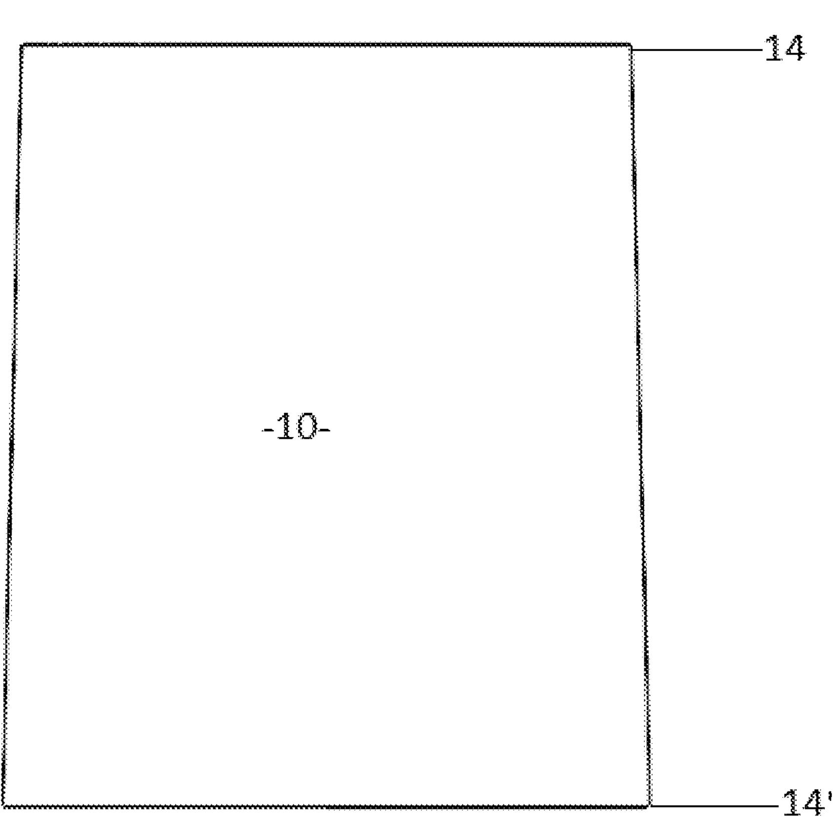
FIG. 3 is an elevation view of the embodiment of FIG. 2.
Figure 4:
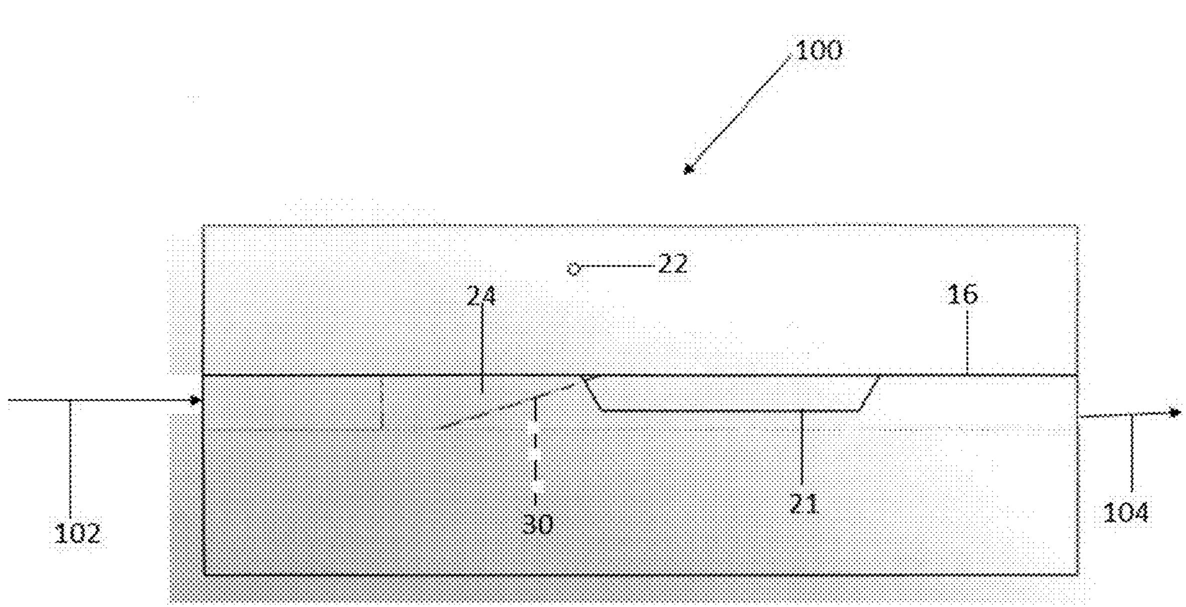
FIG. 4 is a longitudinal side view of the embodiment of FIG. 1.

With reference to FIGS. 2 and 3 each of the plurality of components 10 are schematically represented. However, it is noted that different components having different dimensions, configurations, etc. may be utilized with the present invention in the manner described hereinafter. In various industries components of the type made from a plastic material are molded to include a slight degree of draft in order to eject or facilitate removal of the component from the mold. The term "draft" as used herein refers to a modification of either the dimension or configuration of the component 10, wherein such represents a physical characteristic of the component 10 which facilitates the orientation determination thereof as it passes along the path of travel 12. Accordingly, the component 10 as represented in FIGS. 2 and 3 include one end 14 having a smaller transverse dimension and or outside diameter than that of the opposite end 14'. The dimensional differences between the opposite ends 14 and 14' of each of the components 10 represent physical characteristics that will aid and/or facilitate in the orientation determination of components 10 as they travel along the path of travel 12.

The path of travel 12 may comprise an elongated rail 16 extending between a supply of such components, not shown in detail, but schematically represented by directional arrow 102 and an area where one or more automated procedures are performed, as schematically represented by directional arrow 104 (see FIG. 3). Moreover, the rail is structured, dimensioned and configured to accomplish intended conveyance of the plurality of components 10, while concurrently facilitating the determination of each of the plurality of components 10 being in a correct orientation or being disoriented in an incorrect orientation. Upon determination of a disoriented component (represented hereinafter as 10') the structural and operative features of the system 100 serve to remove each disoriented component 10' from the path of travel 12 and in certain embodiments return it to the original supply of components 102.

Further by way of nonlimiting example and as set forth herein, the component supply 102 may be in the form of a bowl feeder of the type commonly known and conventionally used to orient and feed individual parts for assembly. However, other components supply structures or facilities may be utilized instead of a bowl feeder.

Figure 8:
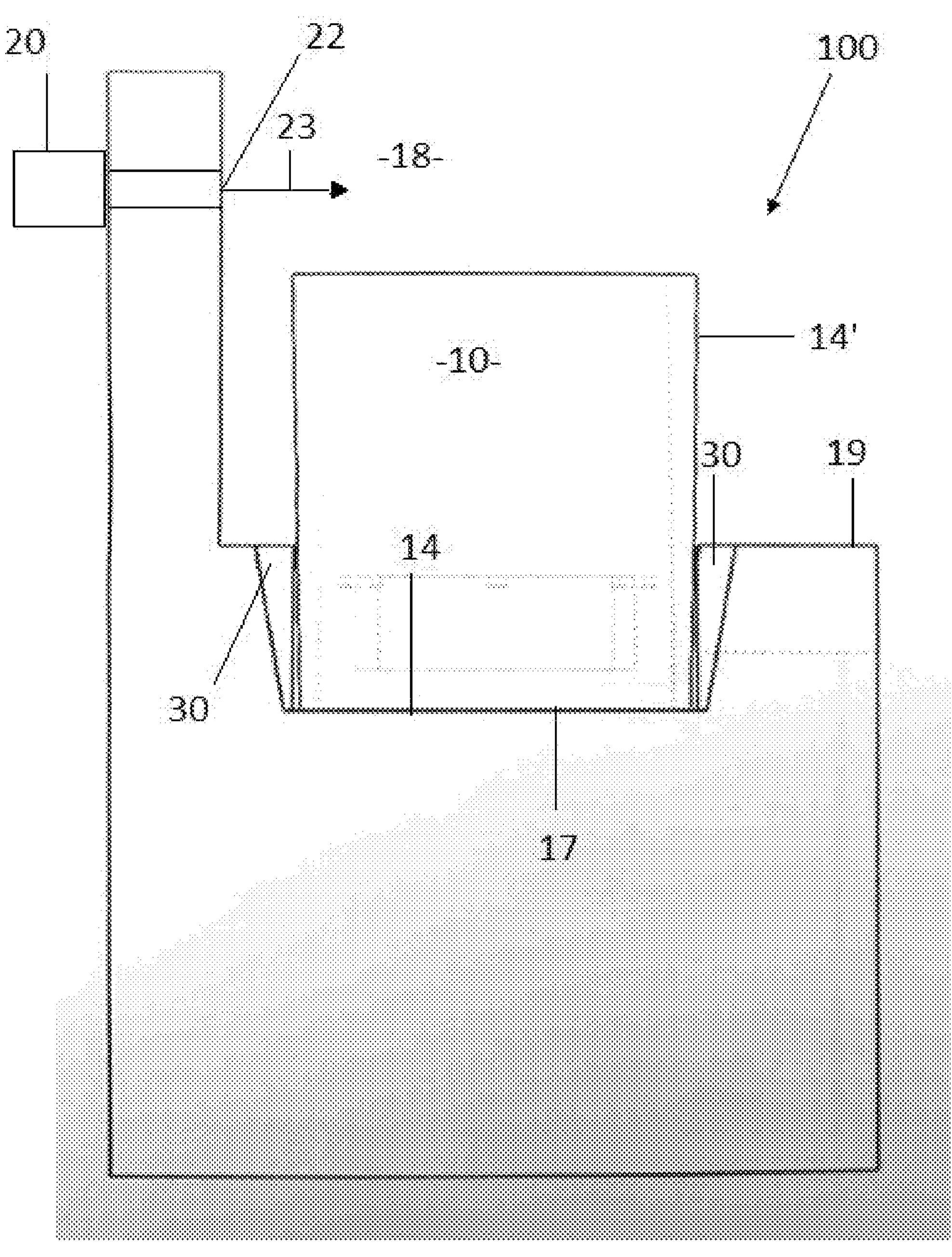
FIG. 8 is an end view of the embodiment of FIGS. 6 and 7.
Figure 9:
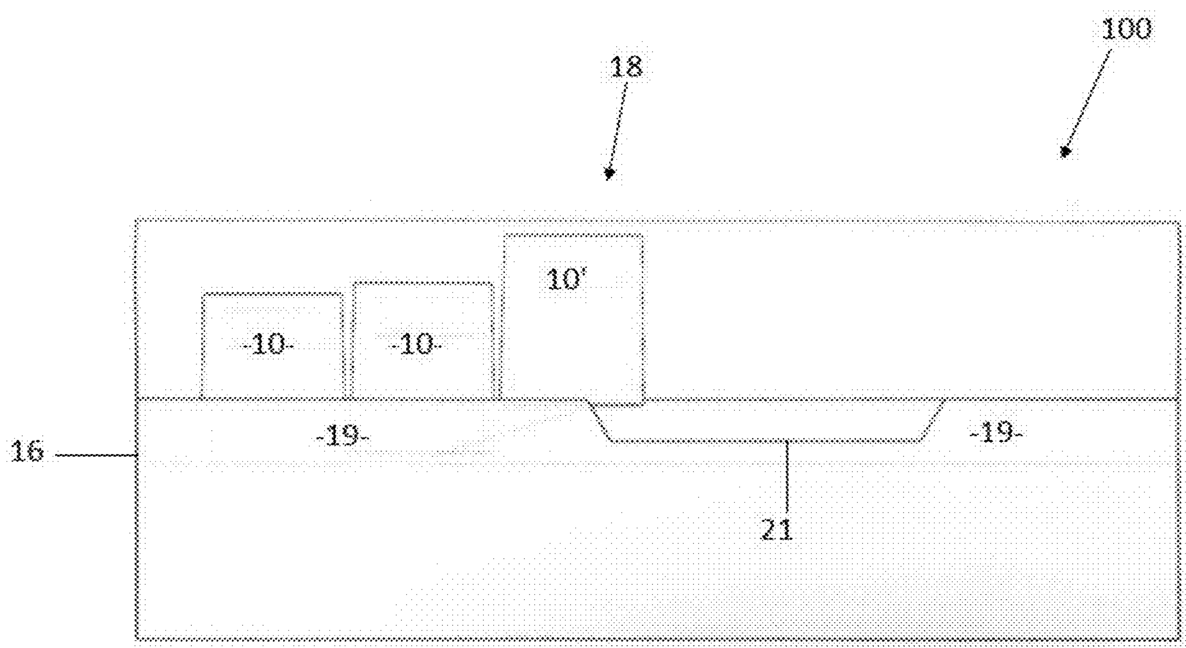
FIG. 9 is a longitudinal side view of the embodiment of FIGS. 1, wherein a plurality of correctly oriented and disoriented components are passing along the path of travel.

Therefore, the system 100 of the present invention includes an ejection zone generally indicated as 18, at least in FIGS. 8 and 9. The ejection zone 18 is cooperatively disposed along the path of travel 12 and rail 16, in communicating relation with at least disoriented components 10' of the plurality of components 10 traveling along the rail 16. Further, an ejector 20 is disposed within or in direct communicating relation to the ejection zone 18 and may be in the form of an air jet 22 as explained in greater detail hereinafter. The ejector 20 is operative to remove the disoriented components 10' from the rail 16, which at least partially defines the path of travel 12. Further, an orientation detector generally indicated as 24 (see FIGS. 5 and 8) is disposed along the path of travel 12 and structured to detect and at least partially segregate disoriented components 10' from a plurality of correctly oriented components 10.

The orientation detector 24 comprises a detection structure 26 (see FIG. 7) disposed and configured for "orientation determination" of the components traveling along the path of travel 12 and rail 16, wherein orientation determination is based, at least in part, on the physical characteristics of the components 10. Such physical characteristics include size and/or configuration of at least predetermined parts such as, but not limited to, the ends of the plurality of components 10 and 10', as set forth herein with primary reference to FIGS. 2 and 3. More specifically, components 10 assuming a correct orientation will be positioned such that the smaller end 14 will be disposed in supported engagement by the bottom surface 17 of the rail 16 as represented in at least FIG. 1. In contrast, a disoriented component 10' will be positioned such that the larger end 14' is disposed in supported engagement with the bottom surface 17 of the rail 16. As set forth hereinafter, these differences in the physical characteristics of the component 10 will facilitate orientation determination as well as how far along the rail 16 and/or path of travel the components 10 and 10' travel.

Therefore, in at least one embodiment, the detection structure 26 is integrated in the rail along a portion of its length thereof. Such integration may comprise an integral formation of the detection structure 26 to the rail or an attachment or connection thereto in an intended and appropriate location. Further, the detection structure 26 is disposed and configured to segregate disoriented components 10' from a remainder of the plurality of correctly oriented components 10 by a displacement thereof from the path of travel 12 and rail 16. Such displacement comprises the disposition of the disoriented components 10' outwardly and/or upwardly from the interior of the rail 16 into the aforementioned ejection zone 18, as represented at least partially in FIG. 9. Once at least partially disposed within the ejection zone 18, the disoriented component 10' will be positioned in direct exposure to the ejector 20 and air jet 22, which is operative to force a removal of each of the disoriented components 10' from the ejection zone 18, the rail 16 and the interior of the path of travel 12. In at least one embodiment, the ejector 20 may be continuously operative to force any disoriented component 10' disposed within the ejection zone 18 back into the component supply or bowl feeder as schematically represented as 102' in at least FIG. 7. Once returned to the component supply 102', the discarded or displaced disoriented component 10' may be reprocessed within or by the bowl feeder, or other type components supply, to assume the correct orientation and return to the path of travel 12.

Additional structural and operative features of one embodiment of the detection structure comprises at least one, but more practically a plurality of two angled ramp segments 30. Each of the preferably two angled ramp segments 30 are integrated into the rail 16, as set forth above, in a position such that the two angled ramp segments 30 concurrently receive the plurality of components 10 as they travel along the path of travel 12 and/or rail 16. Further, the angled ramp segments 30 are disposed in spaced and aligned relation to one another, on opposite sides of the rail 16. In addition, the structural configuration and dimension of each of the angled ramp segments 30 may be substantially equivalent. Such a substantially equivalent configuration preferably comprises an exposed surface of each angled ramp segment 30 extending from the bottom 17 or lower part of the rail 16 to an upper or outer part of the path of travel 12 and the rail 16. Moreover, each angled ramp segment 30 includes an outer surface configuration which is angled or flared upwardly and outwardly (see FIG. 1) from the lower or bottom interior 17 of the rail 16 to the exterior, upper portion thereof. Such an angled or flared configuration may be more specifically defined by a compound angle configuration of the exposed surface. Therefore, the disposition, dimension and configuration of the cooperatively disposed two angled ramp segments 30 will serve to interrupt and engage predetermined portions of disoriented components 10' as they travel along the rail 16. Due to the upwardly and outwardly flared, angled and/or compound angled configuration of the exposed surfaces of the angled ramp segments 30, the engaged disoriented components 10' will be effectively displaced by being lifted or raised (see FIG. 9) out of the interior of the rail 16 into the aforementioned ejection zone 18. As set forth above, once disposed in the ejection zone 18 each disoriented component 10' will be directly exposed to the ejector 20 and air jet 22 causing its removal from the ejection zone 18, interior of the rail 16 and path of travel 12.

Figure 5:
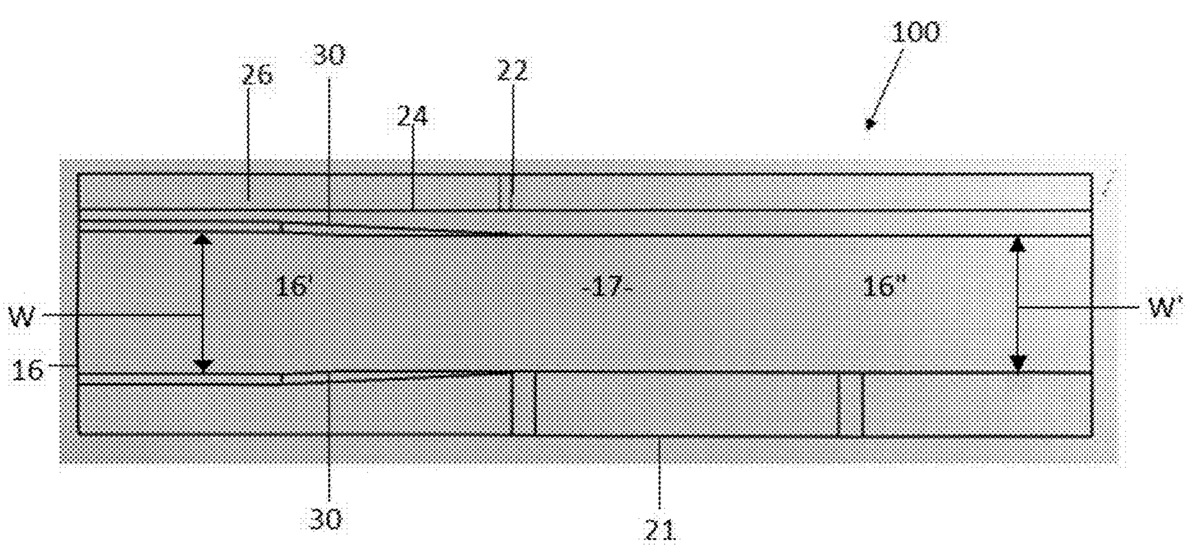
FIG. 5 is a top view of the embodiment of FIGS. 1 and 4.
Figure 7:
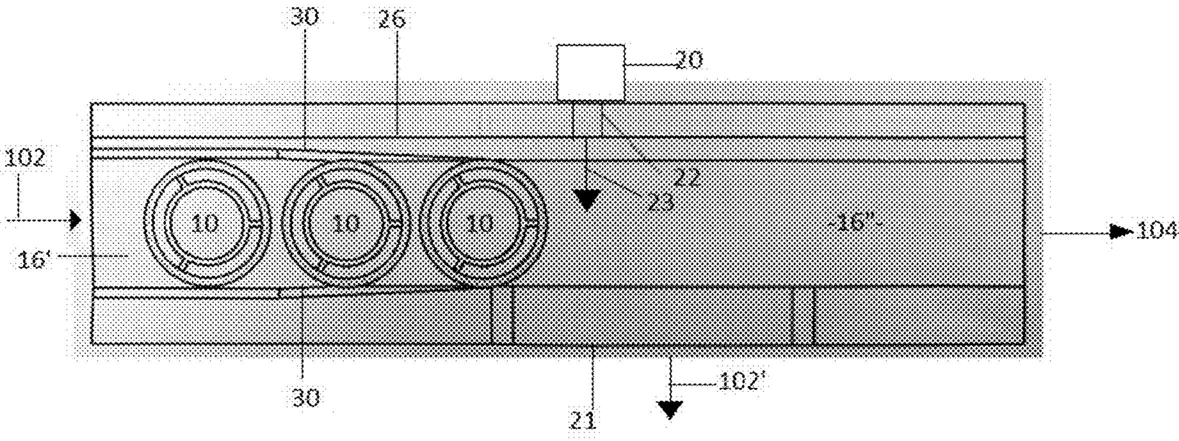
FIG. 7 is a top view of the embodiment of FIG. 6

Yet additional structural and operative features of the path of travel and specifically including the rail 16 facilitate the "orientation determination" of the plurality of components 10 or 10' in cooperation with the operative features of the orientation detector 24 and detection structure 26. More specifically and as represented in FIGS. 5 and 7, at least a portion of the length of the rail which is operatively associated with the aforementioned detection structure 26 comprises a first rail segment 16' and a second rail segment 16". The first and second rail segments 16' and 16" are disposed in linearly aligned relation to one another and collectively define at least a portion of the path of travel 12. However, the first and second rail segments 16 and 16' include different physical characteristics such as, but not necessarily limited to, the widths thereof. Therefore, in at least one embodiment the width W of the first rail segment 16' is greater than that of the width W' of the second rail segment 16". As a result, a plurality of components 10 and 10' which are both correctly oriented (have smaller end 14 supported on bottom 17 of rail 16) and disoriented (have larger end 14' supported on bottom 17 of rail 16) are allowed to travel along the first rail segment 16', because of the increased width W thereof. In contrast, the width W' of the second rail segment 16" is less than that of the first rail segment 16'. As such, the width W' of the second rail segment 16" is only large enough to facilitate or allow travel of the smaller ends 14 of the correctly oriented components 10 to travel there along.

Figure 10:
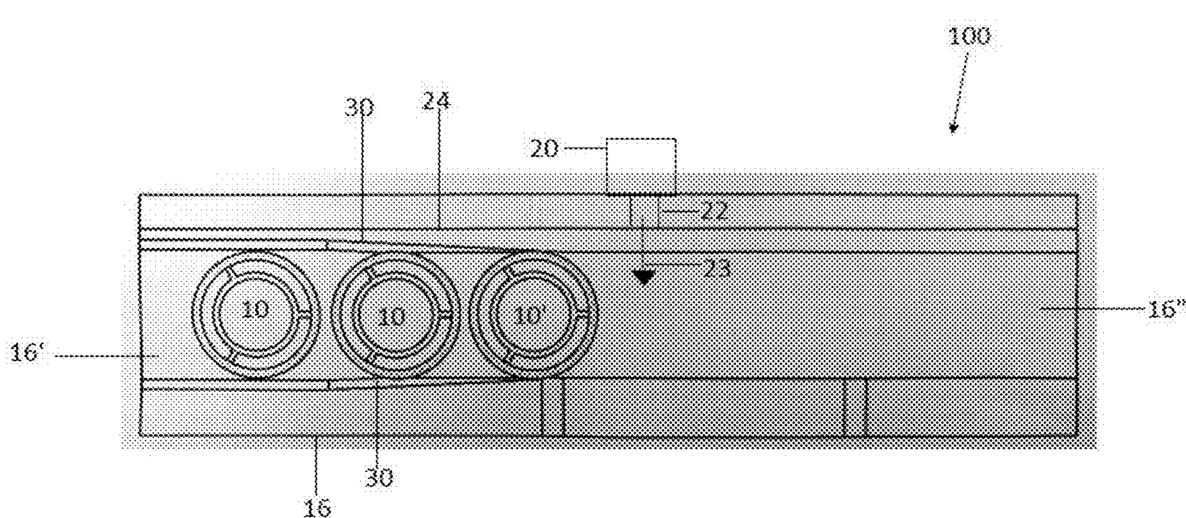
FIG. 10 is a top view of the embodiment of FIG. 9.
Figure 11:
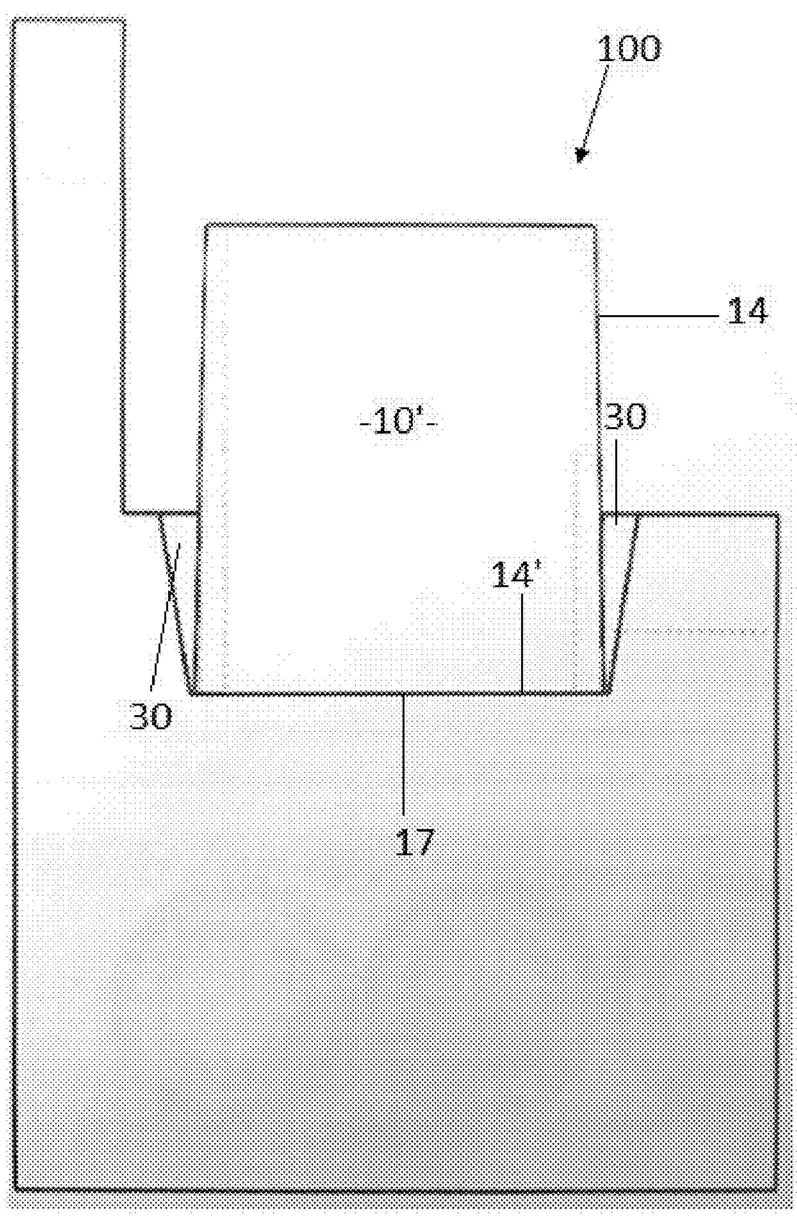
FIG. 11 is an end view of the embodiment of FIGS. 9 and 10.
Figure 12:
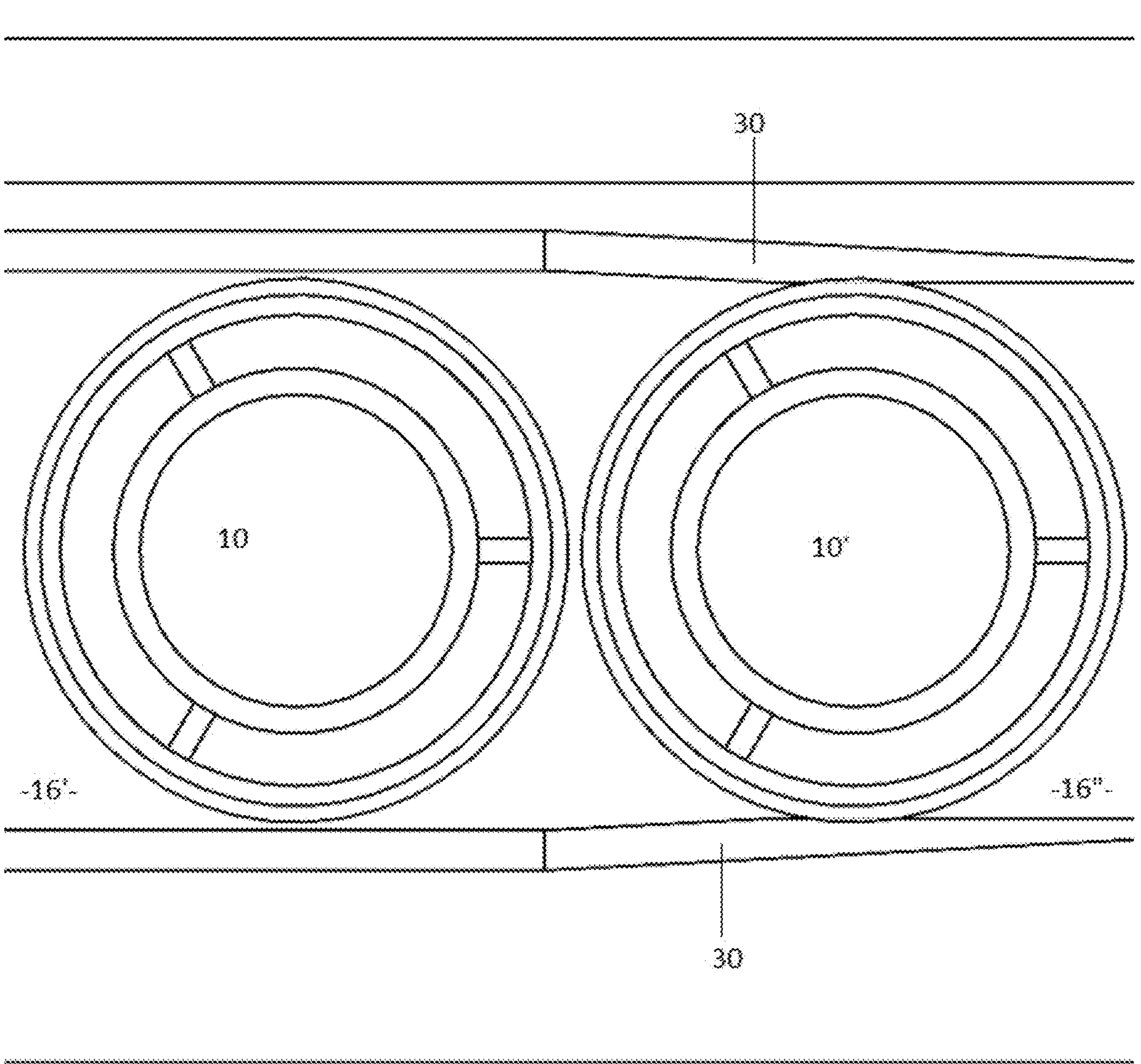
FIG. 12 is a top view in detail and partial cutaway of the embodiment of FIG. 11.

As represented in at least FIGS. 7, 10 and 12, it is to be noted that the width between the angled ramp segments 30 begins to narrow or converge along the length thereof from the with W of the first rail segment 16' to and substantially equal with the with W' of the width of the second rail segment 16".

Figure 6:
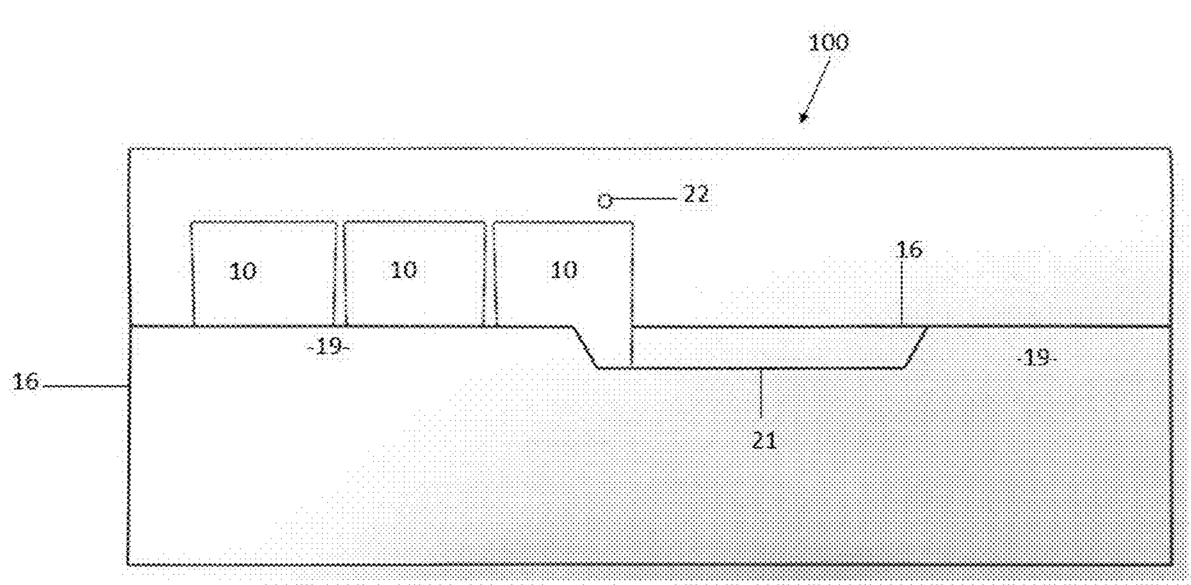
FIG. 6 is a longitudinal side view of the embodiment of FIG. 1 wherein a plurality of components in a correct orientation are passing along the path of travel.

Application of the system as practically applied to correctly oriented components 10 is represented in FIGS. 6-8. More specifically correctly oriented components 10 will travel along the first segment 16' of the rack 16 and reach the detection structure 26 comprising the angled ramp segments 30. In the correct orientation the smaller or lesser dimension to end 14 will be in supported engagement with the bottom 17 of the rail 16. As represented, the width of the end 14 and the sidewalls directly associated there with have a sufficient lesser dimension (see FIGS. 7-8) to pass through and between the angled ramp segments 30, without being interrupted or engaged thereby. As a result, the correctly oriented components 10 will pass from the detection structure 26 into and along the second rail segment 16" in that the lesser transverse dimension of the end 14 is sufficient to pass along the lesser with W' of the second rail segment 16".

However, in contrast and with reference to FIGS. 9-12, the presence of a disoriented component 10', having the larger end 14' on the bottom 17 of the rail 16 (see FIG. 11) will interact with the detection structure 26. As such, the narrowing or converging of the width between the angled ramp segments 30 will result in the outwardly flared exposed surfaces thereof engaging and passing beneath larger end 14', as represented in FIGS. 10 and 12. Due to the upwardly and outwardly flared exposed surfaces of the angled ramp segments 30, the disoriented component 10' will rise along the length of the angled ramp segments 30 from a position coincident to the first rail segment 16' upwardly and outwardly into the ejection zone 18, as represented in FIG. 9. Once in the ejection zone 18 the disoriented component 10' will be exposed to the pressurized fluid flow 23 from the air jet 22 causing its displacement and removal, through gate 21, from the rail 16 and path of travel 12.

In cooperation with the differences in the physical characteristics of the first and second rail segments 16' and 16", the orientation detector 24 and more specifically the detection structure is disposed in at least partially segregating relation therebetween. As indicated herein, the detection structure 26 is operative to remove disoriented components from the rail based on the compound angled and/or outwardly and upwardly flared surface configuration of the two angled ramp segments 30. Accordingly, the segregating features of the detection structure 26 comprises the removal or displacement of the disoriented components 10' traveling along the first rail segment 16' to a point where they are interrupted and engaged by the detection structure 26. However, the dimension and disposition of the detection structure 26, and more specifically the spaced distance between the two angled ramp segments 30, is sufficient to allow the smaller end 14 of the correctly oriented components 10 to pass thereby and/or therethrough without being engaged or otherwise interacting with the angled ramp segments 30. As a further result and as dictated by the lesser with W' of the second rail segment 16", only smaller bottom ends 14 of the correctly oriented components 10 will be allowed to pass there along, after bypassing the angled ramp segments 30 of the detection structure 26.

Yet other structural and operative features of the system 100 include at least one embodiment, wherein the ejector 20 comprising a source of pressurized fluid practically applied in the form of an air jet 22. The air jet 22 may be continuously operative to issue and direct a flow of pressurized air 23 therefrom. Continuous operation of the air jet eliminates the need of a sensor, which would be operative to activate the air jet 22 when the presence of a disoriented component 10' is detected. As indicated, the air jet 22 will be disposed within and/or in direct communicating with the ejection zone 18. The flow of pressurized air 23 will be directed onto any disoriented component 10' displaced into the ejection zone 18 as represented in FIG. 9, through interaction with the detection structure 26, set forth herein. Further, in at least one embodiment the ejector 20, specifically including the air jet 22 and the pressurized fluid flow 23 issuing there from, will be disposed above the rail 16 and or path of travel 12 but in direct exposure to any disoriented component 10' disposed within the ejection zone 18. However, the location of the ejector 20 and pressure jet 22 will be above and out of communication with the plurality of correctly oriented components 10, as represented in FIG. 6, as they travel from the first rail segment 16', through or by the detection structure 26, and below the air jet 22, into and along the second rail segment 16".

The structural and operative features of the present invention further include the rail 16 including oppositely disposed spaced apart retaining sides or walls 19 extending along the opposite longitudinal peripheral edges of both the first rail segment 16' and the second rail segment 16". Therefore, the disposition of the retaining sides 19 of the rail 16 will serve to maintain stability of the plurality of correctly oriented components 10 and disoriented components 10' during their travel or movement along the first and second rail segments 16' and 16". Also, forced travel of the plurality of components 10 and 10' along the rail 16 will be accomplished by an effective force-feeding of components 10 and 10' from the component supply 102 into and along the path of travel 12, as adjacent ones of the plurality of components 10 and 10' will be disposed in engagement with one another.

In cooperation with the retaining sides 19 of the rail 16 is the inclusion of a gate or open area 21 disposed in substantially adjacent or at least partially aligned relation with and below the ejection zone 18. Such disposition and open configuration of the gate 21 facilitates displacement of any disoriented component 10' from the ejection zone 18 by the force exerted thereon by the pressurized fluid flow 23 from the air jet 22

Since many modifications, variations, and changes in detail can be made to the described and preferred embodiments of the invention, it is intended all matters in the foregoing description and shown in the accompanying drawings be interpreted as illustrative, exemplary, and non-limiting. For example, any use of the terms “preferably” or “preferred embodiment,” as well as other language akin thereto, is intended to refer to one particular embodiment, and solely one particular embodiment. As such, it may be appreciated other embodiments are possible, envisioned, and considered part of the invention disclosed herein. Thus, the scope of the invention should be determined by the appended claims and their legal equivalents.

What is claimed is:

1. A system determinative of correct orientation of components during an automation procedure, said system comprising:

a path of travel of the components during the automation procedure, an ejection zone disposed along said path of travel, said path of travel comprising a rail dimensioned and configured to facilitate movement of the components along and relative to a first segment of said rail, an ejector disposed in communicating relation with said ejection zone; said ejector structurally operative to remove disoriented components from said path of trave and rail an orientation detector comprising a detection structure disposed along said path of travel and structured to detect and dispose the disoriented components into said ejection zone, and said detection structure comprises at least two angled ramp segments integrally connected to said rail and disposed in spaced, aligned relation to one another, within and on opposite sides of said rail, each of said at least two angled ramp segments fixed relative to said ejector and extending outwardly from a bottom portion of said rail towards said ejection zone.

2. The system as recited in claim 1 wherein said orientation detector comprises a detection structure at least two angled ramp segments are disposed and configured for orientation determination of the components traveling along and relative to said path of travel rail said orientation determination based on physical characteristics of the components.

3. The system as recited in claim 2 wherein said a detection structure is at least two angled ramp segments are disposed along said path of travel rail in movably engaging relation with a predetermined portion of the disoriented components, said detection structure at least two angled ramp segments configured to displace the disoriented components from said path of travel into said ejection zone.

4. The system as recited in claim 3 wherein said ejector is disposed and structured to remove the disoriented components from said ejection zone.

5. The system as recited in claim 3 wherein said detection structure is at least two angled ramp segments are dimensioned and configured to facilitate passage of correctly oriented components by said detection structure, continuously along said path of travel rail.

6. The system as recited in claim 1 wherein said path of travel is dimensioned and configured to facilitate movement of disoriented components along and relative to said first portion segment of said path of travel rail, concurrent to facilitating passage of correctly oriented components beyond said orientation detector and continuously along a remainder of said path of travel rail.

7. The system as recited in claim 1 wherein said at least two angled ramp segments are cooperatively disposed and configured to engage and displace disoriented components outwardly and upwardly from said bottom portion of said rail into said ejection zone and in exposed relation to said ejector.

8. The system as recited in claim 7 wherein said ejector is disposed in said ejection zone and outward from said rail, said ejector operatively positioned to remove disoriented components disposed in said ejection zone from said rail.

9. The system as recited in claim 1 wherein said rail comprises said first segment and a second segment disposed in linearly aligned relation to one another and collectively defining at least a portion of said path of travel; said detection structure at least two angled ramp segments disposed between and at least partially defining an interface between said first and second segments.

10. The system as recited in claim 9 wherein said first segment is dimensioned to facilitate passage there along of correctly oriented and dis-oriented disoriented components; said second segment dimensioned to facilitate passage there along of correctly oriented components; said detection structure at least two angled ramp segments disposed in fixed, interruptive, movable engagement with disoriented components and configured to displace disoriented components outwardly from said bottom portion of said rail.

11. The system as recited in claim 1 wherein said ejector comprises an air jet operatively disposed to displace disoriented components from said ejection zone via a continuous pressurized fluid flow.

12. The system as recited in claim 1 wherein components passing along said first segment are disposed in movably supported engagement on said bottom portion of said rail.

13. A system determinative of correct orientation of components during an automation procedure, said system comprising:

a path of travel of the components during an automation procedure, an ejection zone disposed along said path of travel and at least partially outward therefrom, an ejector disposed in operative communication with said ejection zone and structurally operative to remove disoriented components from said ejection zone and said path of travel, an orientation detector comprising a detection structure disposed and configured for orientation determination of the components, said orientation determination based on physical characteristics of the components, said path of travel comprising a rail including a first segment and a second segment disposed in aligned relation to one another; said detection structure disposed between and at least partially defining a component segregating interface between said first and second segments, said detection structure comprising at least two angled ramp segments integrally connected to said rail and disposed in spaced, aligned relation to one another, within and on opposite sides of said rail, each of said at least two angled ramp segments fixed relative to said ejector and extending outwardly from a bottom portion of said rail towards said ejection zone, said first segment dimensioned to facilitate passage there along of correctly oriented and disoriented components; said second segment dimensioned to facilitate passage there along of only correctly oriented components, and said detection structure disposed at least two angled ramp segments fixed along said first segment in interruptive, movable engagement with disoriented components from said first segment and configured to displace engaged disoriented components from said path of travel rail into said ejection zone, and an ejector disposed in operative communication with said ejection zone and structurally operative to remove disoriented components from said ejection zone and said path of travel.

14. The system as recited in claim 13 wherein said two angled ramp segments are concurrently disposed fixed relative to said ejector in component receiving relation to said first segment and cooperatively configured to collectively engage and displace disoriented components outwardly from said bottom portion of said rail into said ejection zone and in exposed relation to said ejector.

15. The system as recited in claim 14 wherein said ejector comprises an air jet disposed within said ejection zone and above said rail, said air jet operative to displace disoriented components from said ejection zone, via a pressurized fluid flow.

16. The system as recited in claim 13 wherein said rail further comprises retaining sides extending along opposite sides of a length of each of said first and second segments in retaining relation to components passing along an interior of said rail.

17. The system as recited in claim 16 wherein said rail further comprises a gate formed in at least one retaining side of said second segment, in substantially correspondingly disposed relation to said ejection zone; said gate dimensioned to facilitate passage of disoriented components of therethrough concurrent to displacement thereof from said path of travel.

18. The system as recited in claim 13 wherein components passing along said first segment are disposed in movably supported engagement on said bottom portion of said rail.

* * * * *